(12) United States Patent
Sørensen

(10) Patent No.: US 7,344,616 B2
(45) Date of Patent: Mar. 18, 2008

(54) TUBE WELDING

(75) Inventor: Poul Sørensen, Hårley (DK)

(73) Assignee: 3L-Ludvigsen A/S, Tommerup (DK)

( * ) Notice: Subject to any disclaimer, the term of this patent is extended or adjusted under 35 U.S.C. 154(b) by 122 days.

(21) Appl. No.: 10/577,076

(22) PCT Filed: Oct. 29, 2004

(86) PCT No.: PCT/DK2004/000751

§ 371 (c)(1),
(2), (4) Date: Apr. 25, 2006

(87) PCT Pub. No.: WO2005/042232

PCT Pub. Date: May 12, 2005

(65) Prior Publication Data

US 2007/0023123 A1 Feb. 1, 2007

(30) Foreign Application Priority Data

Oct. 30, 2003 (DK) ................................ 2003 01608

(51) Int. Cl.
*B32B 37/00* (2006.01)
(52) U.S. Cl. .................... 156/228; 156/73.1; 156/292; 156/580.2; 156/581; 156/583.1
(58) Field of Classification Search ............... 156/73.1, 156/228, 292, 308.2, 544, 580, 580.1, 580.2, 156/581, 583.1
See application file for complete search history.

(56) References Cited

U.S. PATENT DOCUMENTS

| 4,023,607 A | 5/1977 | Jensen et al. |
| 4,126,167 A | 11/1978 | Smith et al. |
| 5,300,162 A * | 4/1994 | Brockmeyer et al. ...... 156/73.2 |
| 5,788,620 A | 8/1998 | Aeschbach |
| 5,976,300 A * | 11/1999 | Buchanan et al. ....... 156/273.7 |

FOREIGN PATENT DOCUMENTS

| DE | 197 52 648 C1 | 3/1999 |
| EP | 0269419 A1 | 6/1988 |
| EP | 0 491 380 A | 6/1992 |
| GB | 2193485 A | 2/1988 |
| WO | WO-98/00286 A | 1/1998 |
| WO | WO-00/43189 A | 7/2000 |

\* cited by examiner

*Primary Examiner*—James Sells
(74) *Attorney, Agent, or Firm*—Birch, Stewart, Kolasch & Birch, LLP

(57) ABSTRACT

Method and apparatus for welding two container walls of plastic film (1, 2) to a plastic tube (3) having a substantially circular cross section, wherein the plastic tube (3) is arranged between two parallelly arranged plastic films (1, 2). The two plastic films (1, 2) are made to extend along the outer surface of the plastic tube (3) and to abut each other along a joint face (7) between two welding jaws (5, 6) in an area (8) adjoining the plastic tube (3). The plastic films (1, 2) are welded by means of welding jaws (5, 6) to the outer face of the plastic tube (3) and welded together in the area (8) adjoining the plastic tube (3). The plastic tube (3) is deformed during welding by means of a compressive force applied by the welding jaws (5, (5) to provide the outer surface of the plastic tube (3) with a substantially plane portion (9) extending on both sides of the joint face (7) and substantially perpendicular thereto.

8 Claims, 2 Drawing Sheets

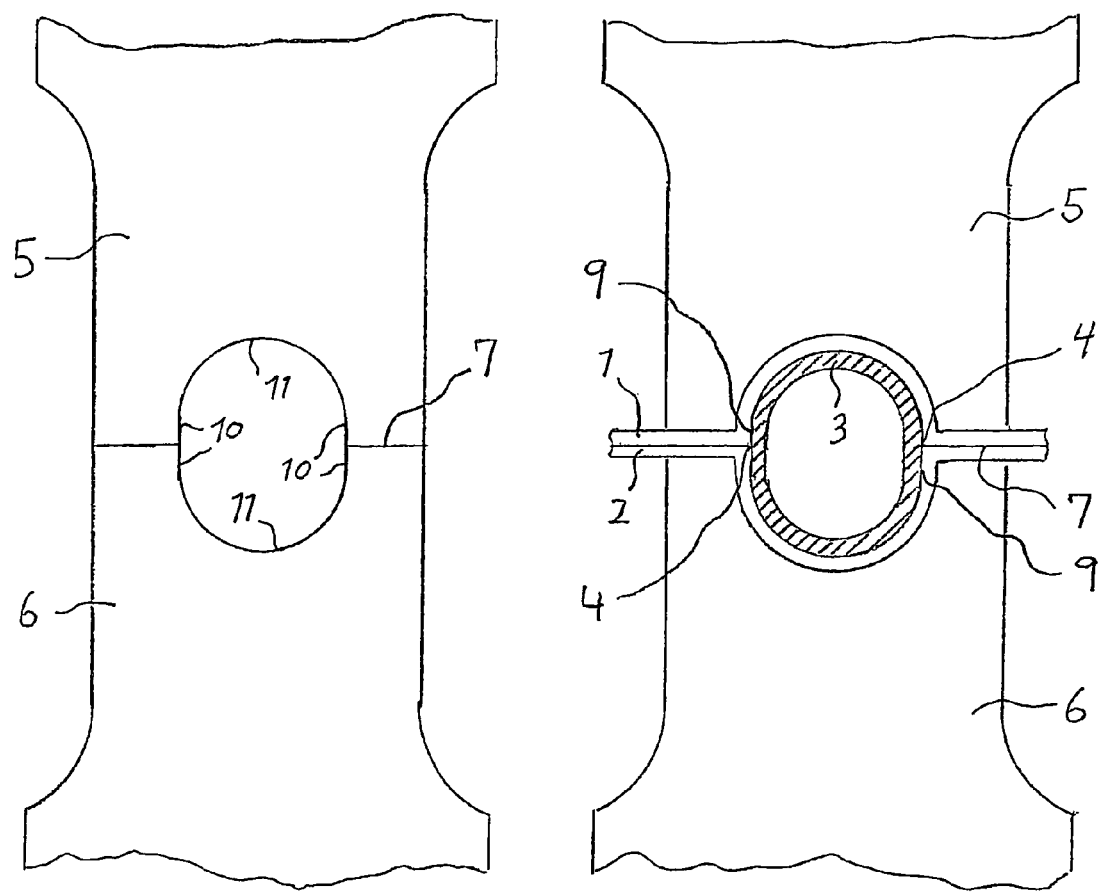

TUBE WELDING

TECHNICAL FIELD

The invention relates to a method according to the preamble to claim 1 and an apparatus according to the preamble to claim 5.

Drainage bags such as urine bags, blood bags and the like are usually made from two superposed plastic films which are welded together along their periphery. For providing the bag with an outlet channel it is common to weld a plastic tube between the two plastic films to provide communication via the tube between the interior and the exterior of the bag. One of the plastic films is thus welded on to one half of the periphery of the plastic tube and the other plastic film is welded on to the other half of the periphery of the plastic tube. The two plastic films are welded together on both sides of the tube. However, optionally, the films may only be welded to the tube at the transition areas on each side of the tube, the films being drawn tightly over the periphery of the tube to avoid leakage. Optionally, an adhesive may be provided between the films and the periphery of the tube.

In practice it has proved difficult to obtain a liquid-tight connection between the outer face of the plastic tube and the plastic films in the two transition areas in which the outer face of the plastic tube and the two plastic films meet. Even though two welding jaws are used, which each in a cross-sectional view has a semi-circular shape and jointly in closed position define a circular opening corresponding to the external diameter of the tube, leaks often arise in the mentioned areas.

BACKGROUND ART

From GB 2193485A it is known to insert a stiffening sleeve in the plastic tube at the weld point to prevent deformation of the plastic tube during welding. U.S. Pat. No. 4,126,167 discloses the use of a nozzle arrangement with wedge-shaped parts instead of a plastic tube with a circular cross section, said wedge-shaped parts extending between the bag walls to prevent an abrupt transition between the plastic films and the nozzle arrangement. From EP 0269419 A1 it is known to arrange a nozzle on the outer face of the plastic tube and the plastic films to ensure a liquid-tight seal between the tube and the bag.

DE 19752648 C1 discloses pre-heating of the plastic tube before it is welded together with the plastic films to improve the weld in the critical transition areas.

From EP 0491380 A2 it is known to arrange shaped pieces of a heat-conducting material around the plastic tube and the plastic films during the welding process and to remove the shaped pieces from the plastic tube and the plastic films only after the welded areas have cooled.

DESCRIPTION OF THE INVENTION

The object of the invention is to provide a new and simple method of welding a plastic tube between two container walls of plastic film so as to obtain a liquid-tight weld. According to the invention the object is obtained by the method stated in the introduction being characterized in that the plastic tube is elastically deformed during welding by means of compressive force applied by the welding jaws to provide the outer face of the plastic tube with a substantially plane portion extending on both sides of the joint face and substantially perpendicular thereto. By these simple means it has surprisingly been possible to obtain very reliable welds in the critical areas, in which one of the plastic films changes from being welded together with the other plastic film to being welded on to the plastic tube.

Even though it normally is preferable to arrange the plastic tube such between two container walls of plastic film that a sealing seam extends between the two layers of plastic film on both sides of the plastic tube, the plastic tube may, however, also be arranged at an edge of the container such that the same plastic film extends 360° around the plastic tube and such that only one sealing seam extends between the two layers of plastic film on one side of the plastic tube.

According to a preferred embodiment the plastic tube is, however, subjected to such a compressive force applied by the welding jaws that it is provided with two diametrically opposite plane portions, each extending on both sides of the joint face and substantially perpendicular thereto.

According to an advantageous embodiment of the method two welding jaws are used, which are adapted to enclose the plastic tube and the plastic films when closed, in a cross-sectional view each welding jaw having a curved welding area and a substantially linear welding portion extending substantially perpendicular to the joint face between the joint face and each end of the curved welding area. As a result an effective welding together of the plastic films and the plastic tube is obtained in a particularly simple manner.

According to an embodiment the curved welding area of the welding jaws may be provided with a radius of curvature slightly exceeding the outer diameter of the plastic tube and further be dimensioned such that during closing of the welding jaws the portions of the plastic tube are pressed outwardly against the linear welding portions of the welding jaws. As a result a reliable welding connection is thus obtained in the critical areas, the plastic films and the plastic tube being further compressed during welding.

The invention further relates to an apparatus as stated in the introduction. The apparatus according to the invention is characterised in that in a cross-sectional view each welding jaw has a curved welding area and a substantially linear welding portion extending substantially perpendicular to the joint face between the joint face and one end of the curved welding area.

According to an advantageous embodiment each welding jaw has a substantially linear welding portion between each end of the curved welding area and the joint face.

According to an embodiment the welding jaws each include a resistance wire defining the curved welding area and the linear welding portion(s), said resistance wires being adapted to join the plastic tube and the plastic films together by impulse heat welding or constant-heat welding.

According to an optional embodiment the welding jaws are shaped as ultrasonic welding jaws or constant-heat welding jaws.

BRIEF DESCRIPTION OF THE DRAWINGS

The invention is explained in greater detail below by means of preferred embodiments illustrated in the drawings, in which FIG. 1 is a sectional view through a portion of a drainage bag, in which a plastic tube is welded between two bag walls of plastic film, FIG. 2 is a diagrammatic sectional view of an apparatus for carrying out the method according to the invention, FIG. 3 shows the apparatus according to FIG. 2 during welding together of two bag walls and a plastic tube.

BEST MODES FOR CARRYING OUT THE INVENTION

Figure 4:
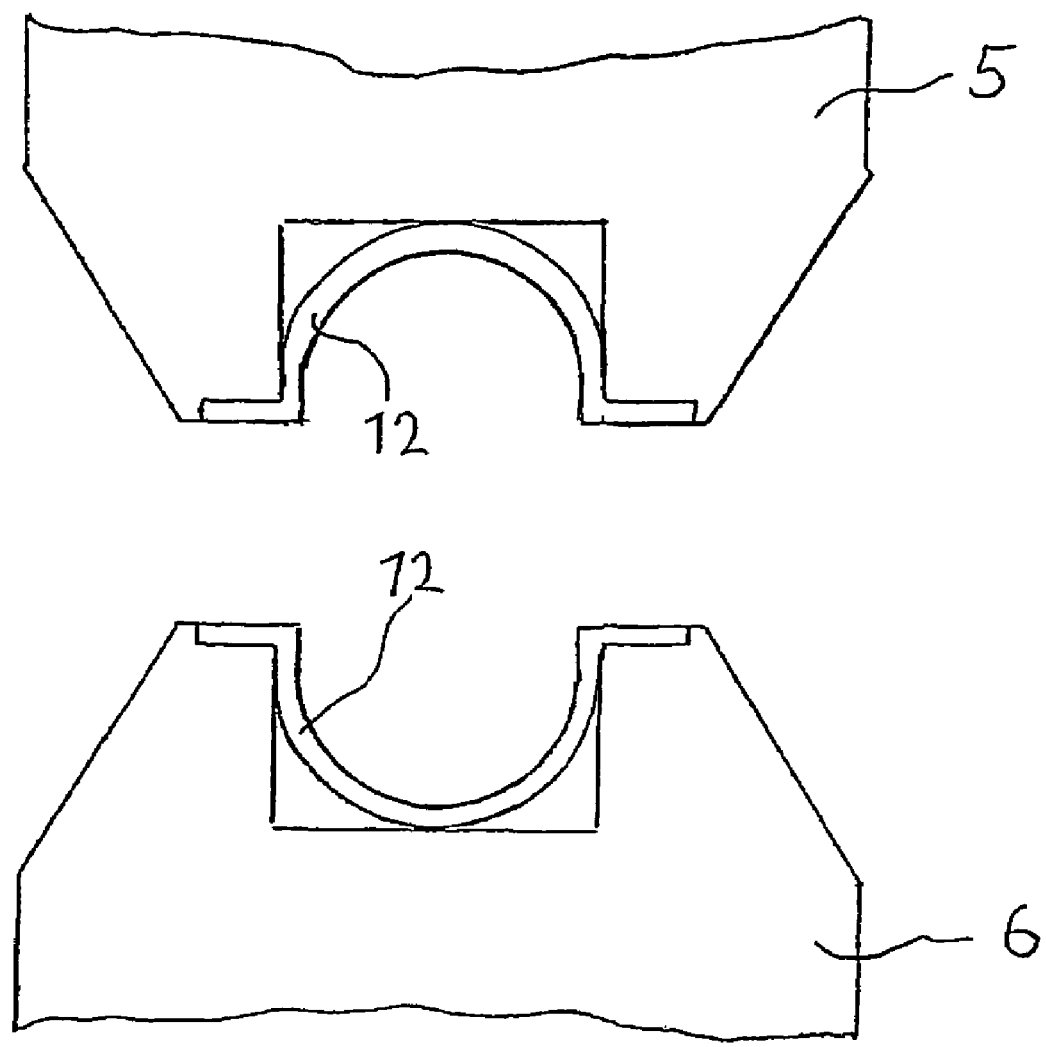
FIG. 4 shows a second embodiment of an apparatus for carrying out the method according to the invention.

FIG. 1 is a cross-sectional view through a portion of a drainage bag, eg. a urine bag, in which a plastic tube 3 is welded between two plastic films 1, 2, which each forms a bag wall and are sealed together along the periphery of the bag outside of the plastic tube 3.

In the method according to the invention the plastic films 1, 2 are welded to at least a portion of the outer periphery of the plastic tube 3 and joined in the areas 8 abutting the plastic tube 3. Conventionally the areas denoted by the reference numeral 4 in FIG. 1 are particularly critical in that triangular cavities arise therein, when the plastic films 1, 2 are placed about the plastic tube 3, said cavities having to be filled by melted material to prevent leakage. Even though the welding is performed carefully such that leaks do not occur at the points 4, leaks may occur at a later stage. The latter may for instance occur if the bag is handled and mechanically stressed before the weld is sufficiently cooled or if the plastic films are heavily pulled, as stress concentrations arise at the points 4, whereby the plastic films 1, 2 may come loose from the plastic tube 3 such that leaks arise.

FIG. 2 illustrates a first apparatus for carrying out the method according to the invention. The apparatus is an ultrasonic welding apparatus with two welding jaws 5, 6 abutting each other at a joint face 7 in the shown closed state. In a cross-sectional view each welding jaw 5, 6 has a curved area 11 and two substantially linear portions 10 extending between the ends of the curved area 11 and the joint face 7. The curved areas 11 correspond substantially to the periphery of the plastic tube 3, which is to be welded together with the plastic films 1, 2. However, the curved areas may have a radius of curvature slightly exceeding that of the plastic tube 3 for reasons which will be explained in detail below.

FIG. 3 illustrates the apparatus shown in FIG. 2 during a welding process, in which a plastic tube 3 is welded together with two plastic films 1, 2 and in which the plastic films 1, 2 are welded together in the area outside of the plastic tube 3. As can be seen from FIG. 3, the plastic tube 3 is deformed when enclosed by the welding jaws 5, 6, the plastic tube 3 thereby being provided with two plane portions 9 extending a short distance on each side of the joint face 7 and perpendicular thereto. When the welding jaws 5, 6 are closed about the plastic tube 3 and the plastic films 1, 2, as shown in FIG. 3, the plastic material is subjected to pressure waves via the welding jaws 5, 6 such that heating occurs in the joints between the plastic film 1, 2 and the plastic tube 3 and between the two plastic films 1, 2, whereby a weld is obtained. The welding jaws 5, 6 shown in FIGS. 2 and 3 may, however, also be shaped as welding jaws welding at constant heat.

By the deformation shown in FIG. 3 of the plastic tube 3 with two plane portions 9 extending substantially perpendicular to the joint face 7 an extremely tight and reliable joining in the critical areas 4 is obtained in a surprising manner.

After welding, the plastic tube 3 adopts its original circular shape.

As mentioned above the curved areas 11 of the welding jaws may be shaped as circular arches with a radius slightly larger than the outer radius of the plastic tube 3. A slight compression is thus obtained providing an outward load on the portions 9 of the plastic tube 3 situated close to the joint face 7, which in turn ensures and enhances the weld in the critical areas 4.

FIG. 4 illustrates an alternative embodiment of an apparatus according to the invention. By means of the apparatus shown in FIG. 4 the plastic films 1, 2 are welded on to the outer face of the plastic tube 3 by impulse heat welding or constant-heat welding, the welding jaws 5, 6 each comprising a resistance wire.

The details shown in the figures are diagrammatic and certain geometries have been exaggerated to render the principles of the invention more clearly. In practice, the inner cross-section of the welding jaws 5, 6 in FIGS. 2-4 have a more "flattened" shape to exert an upward and downward force on the plastic tube, said force pressing the surface of the plastic tube 3 against the linear welding portions 10 of the welding jaws 5, 6.

The method and apparatus according to the invention make it possible to perform a complete welding between the plastic films 1, 2 and the plastic tube 3 and between the plastic films 1, 2 in the areas 8 abutting the plastic tube 3. In practice, it is, however, advantageous to perform a prewelding, in which the plastic films are tacked together and to the plastic tube 3 to facilitate the handling thereof prior to the final welding.

In order not to spoil the provided welds, the plastic material should be allowed to cool down before being subjected to mechanical stresses.

The invention is not restricted to the above embodiments. It is for instance possible to use a separate pair of welding jaws on each side of the plastic tube, the interspacing between the welding jaw pairs and any optional abutment means for the plastic tube ensuring that the plastic tube is elastically deformed to obtain substantially plane portions at the joint face.

It is also possible to extend a single plastic film 360° around the plastic tube and weld it onto itself. As a result, a bag with the outlet tube in a corner is obtained. Various plastic materials may be used for the plastic tube 3 and the plastic films 1, 2, eg. PVC, polyethylene or polypropylene.

As plastic film PVC of a thickness of 0.1-0.3 mm is typically used. The plastic tube 3 may typically be made from PVC and have an outer diameter of 6-20 mm and a wall thickness of 0.5-1 mm.

The invention claimed is:

1. Method of welding two container walls of plastic film (1, 2) on to a plastic tube (3) having a substantially circular cross-section, wherein the plastic tube (3) is arranged between two parallelly arranged plastic films (1, 2), the two plastic films (1, 2) being made to extend along the outer surface of the plastic tube (3) and to abut each other along a joint face (7) between two welding jaws (5, 6) in an area (8) adjoining the plastic tube (3), and wherein the plastic films (1, 2) are welded by means of the welding jaws (5, 6) on to the outer face of the plastic tube (3) and welded together in the area (8) adjoining the plastic tube (3), wherein the plastic tube (3) is elastically deformed during welding by means of a compressive force applied by the welding jaws (5, 6) to provide the outer face of the plastic tube (3) with two diametrically opposed plane portions (9) which each extends on both sides of the joint face (7) and substantially perpendicular thereto, where two welding jaws (5, 6) are used, which are adapted to enclose the plastic tube (3) and the plastic films (1, 2) when closed, in a cross-sectional view each welding jaw (5, 6) having a curved welding area (11), characterised in that in a cross-sectional view each welding jaw (5, 6) having a substantially linear welding portion (10) extending substantially perpendicular to the joint face (7) between the joint face (7) and each end of the curved welding area (11).

2. Method according to claim 1, characterised in that the curved welding area (11) of the welding jaws (5, 6) has a radius of curvature slightly exceeding the outer diameter of the plastic tube (3), and further dimensioned to allow the portions (9) of the plastic tube (3) to be pressed outwards against the linear welding portions (10) of the welding jaws (5, 6) during closure of the welding jaws (5, 6).

3. Apparatus for welding two container walls of plastic film (1, 2) on to a plastic tube (3) having a substantially circular cross section, said apparatus including two welding jaws (5, 6) adapted to close about the plastic tube (3) and the plastic films (1, 2), the two plastic films (1, 2) thereby being made to abut each other along a joint face (7) of the welding jaws (5, 6) in an area (8) adjoining the plastic tube (3) and wherein the welding jaws (5, 6) are adapted to weld the plastic films (1, 2) to the outer face of the plastic tube (3) and to weld the plastic films (1, 2) together in the area (8) adjoining the plastic tube (3), in a cross-sectional view each welding jaw (5, 6) has a curved welding area (11), characterised in that in a cross-sectional view each welding jaw (5, 6) having a substantially linear welding portion (10) extending substantially perpendicular to the joint face (7) of the welding jaws (5, 6)between the joint face (7) of welding jaws (5, 6) and one end of the curved welding area (11).

4. Apparatus according to claim 3, characterised in that each welding jaw (5, 6) has a substantially linear welding portion (10) between each end of the curved welding area (11) and the joint face (7).

5. Apparatus according to claim 3, characterised in that the welding jaws (5, 6) each comprises a resistance wire (12) defining the curved welding area (11) and the linear welding portion(s) (10), said resistance wire (12) being adapted to weld the plastic tube (3) and the plastic films (1, 2) together at impulse heat welding or constant-heat welding.

6. Apparatus according to claim 3, characterised in that the welding jaws (5, 6) are shaped as ultrasonic welding jaws or constant-heat welding jaws.

7. Apparatus according to claim 4, characterised in that the welding jaws (5, 6) each comprises a resistance wire (12) defining the curved welding area (11) and the linear welding portion(s) (10), said resistance wire (12) being adapted to weld the plastic tube (3) and the plastic films (1, 2) together at impulse heat welding or constant-heat welding.

8. Apparatus according to claim 4, characterised in that the welding jaws (5, 6) are shaped as ultrasonic welding jaws or constant-heat welding jaws.

* * * * *